United States Patent [19]

Nakazima et al.

[11] 4,411,930
[45] Oct. 25, 1983

[54] METHOD AND APPARATUS FOR SURFACE-HARDENING TREATMENT OF SYNTHETIC RESIN ARTICLES

[75] Inventors: Atushi Nakazima; Mitisuke Edamatu, both of Otake, Japan

[73] Assignee: Mitsubishi Rayon Company Ltd., Tokyo, Japan

[21] Appl. No.: 404,486

[22] Filed: Aug. 2, 1982

[30] Foreign Application Priority Data

Aug. 3, 1981 [JP] Japan .................................. 56-121553
Mar. 23, 1982 [JP] Japan .................................. 57-45982

[51] Int. Cl.³ ............................................. B05D 3/06
[52] U.S. Cl. .................................. 427/54.1; 118/324; 118/DIG. 4; 427/44; 427/420
[58] Field of Search ...................... 427/44, 54.1, 420; 118/DIG. 4, 324

[56] References Cited

U.S. PATENT DOCUMENTS

| | | | |
|---|---|---|---|
| 1,859,652 | 5/1932 | Bullerjahn | 427/420 |
| 2,821,959 | 2/1958 | Franz | 118/DIG. 4 |
| 2,996,407 | 8/1961 | Meeker | 427/420 |
| 3,132,966 | 5/1964 | Hughes et al. | 118/DIG. 4 |
| 3,381,445 | 5/1968 | Vogt | 118/DIG. 4 |
| 3,956,540 | 5/1976 | Laliberte et al. | 427/430 |
| 4,036,168 | 7/1977 | Laliberte et al. | 118/421 |
| 4,085,701 | 4/1978 | Anson et al. | 118/DIG. 4 |
| 4,233,929 | 11/1980 | Hurst et al. | 427/420 |

FOREIGN PATENT DOCUMENTS

| | | | |
|---|---|---|---|
| 2742206 | 3/1979 | Fed. Rep. of Germany | 427/420 |
| 1201935 | 8/1970 | United Kingdom | 118/DIG. 4 |
| 319354 | 1/1972 | U.S.S.R. | 118/DIG. 4 |

Primary Examiner—John H. Newsome
Attorney, Agent, or Firm—Cushman, Darby & Cushman

[57] ABSTRACT

Method and apparatus for the surface-hardening treatment of a synthetic resin article is provided, wherein the article is brought into countercurrent contact with a freely falling liquid film of a surface-hardening solution while the article is gradually pulled up thereby to be coated with the surface-hardening solution, and then, the coated article is irradiated with ultraviolet rays to cure the coating. The article is conveyed to a hardening solution tank by a first conveyor where the surface-hardening solution is caused to flow down on downwardly inclined liquid film guide plates attached to the hardening solution tank, at a flow rate of 2 to 15 ml/sec·cm of the width of the guide plate. The countercurrent contact of the article with the liquid film is initiated at a point 3 to 30 mm apart from the flow-out end of the guide plates. The hardening solution is circulated to effect the temperature adjustment and filtration. The coated article in the state of being hung on a hanger is transferred by an intermediate conveyor to a second conveyor whereby the article is subjected to ultraviolet irradiation. The conveyors, the hardening solution tank and the ultraviolet ray-irradiating device are provided within a closed treating chamber.

5 Claims, 10 Drawing Figures

Fig. 3
Fig. 4
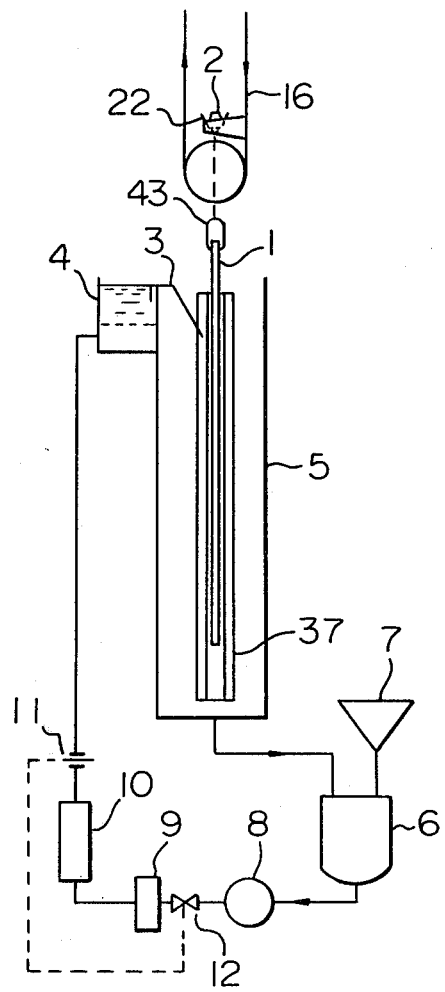
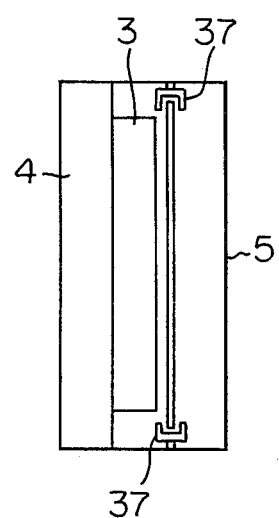

METHOD AND APPARATUS FOR SURFACE-HARDENING TREATMENT OF SYNTHETIC RESIN ARTICLES

BACKGROUND OF THE INVENTION (1) Field of the Invention

This invention relates to a method for the surface-hardening treatment of a synthetic resin article and an apparatus for use in carrying out said method.

(2) Description of the Prior Art

Synthetic resins excellent in the molding processability and impact resistance are used in various fields. However, most synthetic resins have problems such that the surfaces of shaped articles of these synthetic resins are not hard, are readily marred and, if mars and scratches are formed on the surfaces, the commercial values of the shaped articles are reduced. These problems are serious particularly in optically transparent materials such as lenses and light-transmitting transparent materials as lamp lenses. It has, therefore, eagerly been desired to impart a scratch resistance to the surfaces of shaped articles.

A method has been proposed and adopted in which a silicone type cured coated film is formed on the surface of a shaped article to improve the surface hardness. As means for forming a uniform coating of a cured film, U.S. Pat. Nos. 3,956,540 and 4,036,168 disclose a method and apparatus for hardening the surface of a shaped article by applying a fluoroethylene polysilicate polymer as the surface-hardening liquid onto the surface of the shaped article. The hardening solution used in this conventional technique is cured by application of heat, and the curing must be carried out in two stages, namely, after the pre-curing step, the surface of the shaped article of a tack-free state must be further treated in the subsequent curing step for imparting thereto the desired mar or abrasion resistance.

Research was made in view of obtaining a synthetic resin shaped article having enhanced surface hardness and abrasion resistance by a method wherein a hardening solution curable with ultraviolet rays is applied onto the surface of a synthetic resin shaped article and whereby a uniform coating can be formed and the coating can be cured in a single curing step.

The surface-hardening method of the present invention falls within the category of the so-called flow-coating method in which a coating composition is flow-coated on an article to be coated. As the flow-coating method adopted in the art of coating, a so-called showering method can be mentioned in which a coating composition is showered onto an article having a complicated shape from many jet nozzles and a so-called curtain-coating method in which a coating composition is fallen down in the form of a film from a long slit of a nozzle onto a substantially plate-shaped article to be coated, which is travelled at a high speed. The former method has problems in that adjustment of the thickness of the coating is difficult, the thickness becomes uneven and a pattern of the flow of the coating composition is readily formed on the resulting cured coating. In the latter method, it is generally necessary to move an article to be coated at a high speed, and a high dimension precision is required for the slit-like orifice in forming a curtain of the liquid coating composition. Furthermore, the latter method has problems in that it is very difficult to form a thin coating and both the front and back surfaces of an article to be coated cannot simultaneously be coated.

For the foregoing reasons, a dip-coating method or a spray-coating method is generally used in various fields for obtaining uniform coatings on an industrial scale. However, the dip-coating method is employed only when the entire surface of an article is coated. Although an article having a complicated shape can be coated according to the spray-coating method, the efficiency of deposition of a coating composition on an article to be coated is low in the spray-coating method and only about 20% to 30% of the coating composition is utilized. Namely, the loss of the coating composition is very large in the spray-coating method. Moreover, the problem of pollution of the working environment and coating equipment is serious in the spray-coating method, and large equipment investment is necessary for preventing environmental pollution.

SUMMARY OF THE INVENTION

It is therefore a primary object of the present invention to provide a method and an apparatus for the surface-hardening treatment of a synthetic resin article whereby both one surface coating and two surface coating can be effected whether the surface or surfaces of the synthetic resin article are flat or curved or of any other shape.

Another object of the present invention is to provide a method and an apparatus for the surface-hardening treatment of a synthetic resin article whereby an abrasion resistant surface coating of good uniformity and smoothness can be formed.

Still another object of the present invention is to provide a method and an apparatus for surface-hardening treatment of a synthetic resin article whereby loss of a coating composition, such as observed in the spray-coating method, can be minimized and environmental pollution is not caused.

A further object of the present invention is a method and an apparatus for surface-hardening treatment of a synthetic resin article whereby the amount of a coating composition retained in the coating system can be reduced irrespectively of the size of a synthetic resin article to be coated and, therefore, a paint involving a large risk of occurrence of a fire, such as a volatile solvent type paint, or a paint having a relatively short pot life, can effectively be used.

Other objects and advantages of the present invention will be apparent from the following description.

In one aspect of the present invention, a method is provided for coating the surface of a synthetic resin article and hardening said coating, wherein the synthetic resin article is brought into countercurrent contact with a freely falling liquid film of a surface-hardening solution while the synthetic resin article is gradually pulled up, to coat the surface of the synthetic resin article with the surface-hardening solution, and the coated synthetic resin article is irradiated with ultraviolet rays to cure the coating, said method being characterized in that (a) the synthetic resin article is conveyed to a hardening solution tank by a first conveyor where the synthetic resin article is coated with the hardening solution and the coated synthetic resin article is then conveyed to an ultraviolet ray-irradiating step by a second conveyor through an intermediate conveyor; (b) the surface-hardening solution is caused to flow down on liquid film guide plates attached to the hardening solution tank, at a flow rate of 2 to 15 ml per second and per cm of the width of the liquid film guide plate, and the counter current contact of the synthetic resin article with the liquid film is initiated at a point 3 to 30 mm apart from the flow-out end of the guide plates; and (c) the hardening solution is circulated to effect the temperature adjustment and filtration.

In another aspect of the present invention, an apparatus is provided for coating the surface of a synthetic resin article and hardening said coating, wherein the synthetic resin article is brought into countercurrent contact with a freely falling liquid film of a surface-hardening solution while the synthetic resin article is gradually pulled up to coat the surface of the synthetic resin article with the surface-hardening solution, and the coated synthetic resin article is irradiated with ultraviolet rays to cure the coating, said apparatus comprising (a) a conveyor device comprising a first conveyor for conveying the synthetic resin article to a hardening solution tank to coat the synthetic resin article with the surface-hardening solution, a second conveyor for conveying the synthetic resin article to an ultraviolet ray-irradiating device and an intermediate conveyor for transferring hangers each having the synthetic resin article hung thereon from the first conveyor to the second conveyor; (b) a device comprising guide plates attached to the hardening solution tank in the state inclined downwardly at an angle of 10° to 80° with respect to the horizontal direction to form a freely falling liquid film of the surface-hardening solution, with which the surface of the synthetic resin article is brought into countercurrent contact; (c) a device comprising a pump for circulating the solution through a pipe line from and to the hardening solution tank, and filter, a heat exchanger, a flow rate-controlling valve and a flow rate-detecting pressure gauge or flowmeter, which are arranged downstream of the circulating pipe line; and (d) a device comprising a substantially closed treating chamber integrally surrounding said conveyor device, hardening solution tank and ultraviolet ray-irradiating device, an air feed fan for feeding air into said treating chamber, a filter for removing dusts from air and an air conditioner for adjusting the temperature and humidity of air.

BRIEF DESCRIPTION OF THE DRAWINGS

FIG. 3 is a view showing the entire structure of the coating apparatus for use in an embodiment in which one surface of a flat plate article is coated;

FIG. 4 is a top view of a part of the apparatus shown in FIG. 3;

DESCRIPTION OF THE PREFERRED EMBODIMENTS

Figure 1:
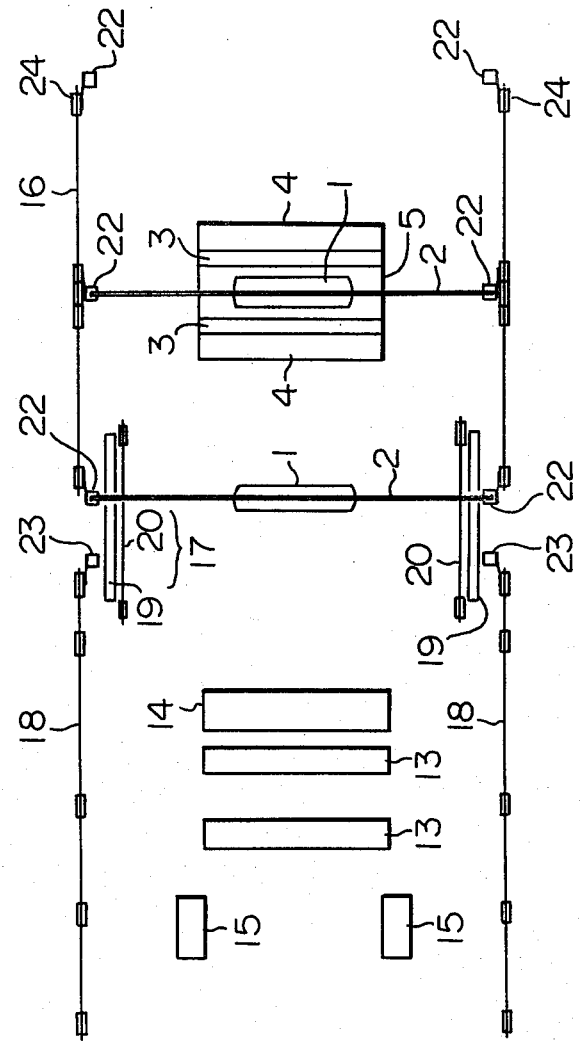
FIGS. 1 and 2 are plan and front views respectively, showing the entire structure of the surface-hardening treatment system according to the present invention.

The method of the present invention will now be described in detail.

An article of a synthetic resin to be treated (hereinafter referred to as "synthetic resin article") is hung on a hanger and is conveyed by a first conveyor to a hardening solution tank, from and to which a surface-hardening solution (hereinafter referred to "hardening solution") is circulated.

In the present invention, a liquid film guide plate or plates are disposed adjacent to one surface or both the surfaces of a synthetic resin article in a hardening solution tank. Thus, the coating of one surface or both the surfaces of the article is made possible and, furthermore, the coating of only the outer surface of cylindrical or case-like article is also made possible.

The method of forming a freely falling liquid film in the present invention resembles the curtain-forming method adopted in the conventional curtain-coating method. In the curtain-coating method, all of the freely falling liquid film is substantially coated on a synthetic resin article. The present invention is fundamentally different from this conventional curtain-coating method because in the present invention, only a limited portion of a freely falling liquid film is coated on a synthetic resin article. More specifically, in the curtain-coating method, a synthetic resin article is moved at such as high speed as several meters per second, whereby a freely falling liquid film is thinly coated on the surface of the synthetic resin article. In contrast, in the method of the present invention, a synthetic resin article which is brought in contact with a freely falling liquid film is moved upward at a low speed, whereby the amount of the freely falling liquid film coated on the synthetic resin article is controlled.

Furthermore, in the conventional curtain-coating method, the thickness of the obtained coating is ordinarily 20 to 30 or more and it is difficult to obtain a coating having a thickness smaller than 20, whereas in the method of the present invention, a thin coating having a thickness of 5 to 20 can be obtained.

In the present invention, it is indispensable that the flow rate of the freely falling liquid film be uniform over the entire width thereof. It is also indispensable that the flow rate of the freely falling liquid film be at least 2 ml per cm of the width and per second. If the flow rate is lower than this critical level, after the freely falling liquid film leaves the lower end of the guide plate, it may separate or may deflect backward and not fall straight down, and the operation stability is reduced. Furthermore, if the flow rate per unit width is too large, a flow pattern is formed on the coating. Thus, the flow rate per cm of the width of the freely falling liquid film should be up to 15 ml per second.

In order to uniformalize the direction of the flow of the liquid film and the freely falling speed over the entire width, it is indispensable that the liquid film guide plate for forming the freely falling liquid film be downwardly inclined and the inclination angle of the liquid film be uniform over the entire width thereof. As the direction of the liquid film flowing out from the guide plate is close to the horizontal direction, the force of impingement of the liquid film against the synthetic resin article is large and the liquid film is waved, which leads to the formation of a wavy pattern on the resulting surface coating. In contrast, in the case where the liquid film flows out from the guide plate in a direction close to the vertical direction, the point at which the synthetic resin article is brought into contact with the liquid film undesirably fluctuates, and the thickness of resulting coating becomes uneven. It is preferred that the downward extrusion angle with respect to the horizontal direction be 10° to 80°, especially 30° to 70°.

In the method of the present invention, the above-mentioned contact-starting point is very significant, because the thickness of the coating depends upon the speed of the synthetic resin article separating from this contact-starting point. In the present invention, it is indispensable that the above-mentioned contact-starting point be located in the vicinity of the point where the liquid film separates from the guide plate. The first reason is that vena contracta is caused in the freely falling liquid film by the surface tension and the coating width is reduced, and the second reason is that as the freely falling liquid film separates from the guide plate, the contact starting point of the liquid film readily fluctuates. In the present invention, the above-mentioned contact-starting point is located at a point 3 to 30 mm, preferably 5 to 15 mm, apart from the separating end of the liquid film guide plate.

In the present invention, it is apparent that the higher the speed of pulling up the synthetic resin article is, the larger the thickness of the coating is, and the lower the pulling speed is, the smaller the thickness of the coating is. It has now been found that in the method of the present invention, as in the dip-coating method, the thickness of the coating is substantially proportional to the one-half power of the pulling speed. This means that the method of the present invention is advantageous in that the thickness of the coating can easily be adjusted by changing the pulling speed. When the viscosity of the hardening solution is 2 to 20 cP, it is preferred that the pulling speed be adjusted to 0.2 to 1.5 cm/sec.

In the dip-coating method, a coating composition tank in which a synthetic resin article is entirely included, should be used. In the present invention, such a large tank filled with the hardening solution is not necessary, but it is sufficient if an overflowing tank necessary for forming a uniform liquid film on the liquid film guide plate is arranged. Accordingly, the amount of the hardening solution to be charged in the coating device is much smaller in the method of the present invention than in the dip-coating method. This means that the method of the present invention is advantageous in that the running cost for a coating solution having a short life can be reduced.

When the hardening solution is directly applied to the surface of a synthetic resin article, spitting or cissing is readily caused and pinholes are readily formed. In order to obtain a coated article excellent in the surface smoothness, it is necessary to circulate and filtrate the hardening solution to be coated on the surface of the synthetic resin article, so that solids and foreign matters contained in the hardening solution are completely removed.

Furthermore, it is necessary to keep a clear atmosphere free of dusts throughout the surface-hardening solution-coating zone, and it often is necessary to control the temperature and humidity of the atmosphere. If such controls are not performed, trouble such as uneven thickness, whitening and orange peel are caused on the coating because of the abnormal speed of evaporation from the cured coating or condensation of water in air on the surface of the coating.

In the method of the present invention, the surface of a synthetic resin article to be treated may be washed by a preliminary washing treatment. As the washing liquid, warm water maintained at 30° C. to 80° C. and an aqueous neutral detergent solution can be mentioned.

Furthermore, as the washing liquid, organic solvents having a boiling point lower than 100° C. may be preferably used, such as methanol, ethanol, propyl alcohol, acetone, methylethyl ketone, and cyclohexane.

When flow-coating is carried out under the above-mentioned conditions, it is necessary that the temperature $T_s$ of the hardening solution be adjusted so that the formula $10° C. \leq T_s \leq 30° C.$ is satisfied. If the temperature $T_s$ of the hardening solution is lower than 10° C., the viscosity of the hardening solution is too high and it becomes difficult to obtain a coating having a uniform thickness. If the temperature $T_s$ of the hardening solution is higher than 30° C., deterioration of the hardening solution is accelerated or creasing is caused in the synthetic resin article.

In the present invention, it is also important that the ambient temperature $T_a$ be adjusted relative to the temperature of the hardening solution. The term "ambient temperature" used herein is the temperature of the region above the point where the synthetic resin article separates from the contact with the freely falling liquid film of the hardening solution, in which the solvent component of the hardening solution coated on the synthetic resin article is evaporated. It is indispensable that the ambient temperature be higher than the temperature of the hardening solution ($T_s < T_a$) and the difference ($T_a - T_s$) between the ambient temperature and the temperature of the hardening solution be smaller than 20° C.

If the ambient temperature is lower than the temperature of the hardening solution, the evaporated solvent component of the hardening solution is condensed and the formed liquid adheres to the formed coating to dilute and wash away the coating.

If the difference between the ambient temperature and the temperature of the hardening solution is larger than 20° C., the rate of heat transfer from the atmosphere to the surface of the coating being formed is too high. Hence, a smooth coating surface cannot be obtained and a striped pattern is readily formed. Furthermore, if the dew point of the atmosphere above the hardening solution is higher than the level of ($T_s - 3°$ C.), condensation of water in air is caused by reduction of the temperature of the coating due to evaporation of the solvent from the coating surface, and, hence, orange peel is caused on the surface of the coating.

The hardening solution used in the present invention preferably consists of a coating composition comprising a monomer mixture containing at least 30% by weight, preferably 30 to 95% by weight, based on the weight of the monomer mixture, of an acrylic monomer having in the molecule at least three acryloyloxy or methacryloyloxy groups as crosslinkable unsaturated groups and an organic solvent optionally with additives imparting various properties, such as antistatic agent and a dyeing aid. As the acrylic monomer having in the molecule at least three acryloyloxy or methacryloyloxy groups, monomers represented by the following general formula [I]:

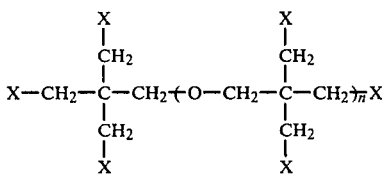

can be mentioned, wherein n is 0 or an integer of from 1 to 4, at least 3 of the groups X are CH$_2$=CH—COO— or CH$_2$=C(CH$_3$)—COO— groups and the remaining groups X are —OH groups. The monomers of the formula [I] include, for example, pentaerythritol trimethacrylate, pentaerythritol triacrylate, pentaerythritol tetramethacrylate, pentaerythritol tetraacrylate, dipentaerythritol trimethacrylate, dipentaerythritol triacrylate, dipentaerythritol tetramethacrylate, dipentaerythritol tetraacrylate, dipentaerythritol pentamethacrylate, dipentaerythritol pentaacrylate, dipentaerythritol hexamethacrylate, dipentaerytritol hexaacrylate, tripentaerythritol trimethacrylate, tripentaerythritol triacrylate, tripentaerythritol tetramethacrylate, tripentaerythritol tetraacrylate, tripentaerythritol pentamethacrylate, tripentaerythritol pentaacrylate, tripentaerythritol hexamethacrylate and tripentaerythritol hexaacrylate.

In order to improve the properties of the hardening solution, up to 60% by weight of a bifunctional methacrylate or acrylate monomer represented by the following general formula [II]:

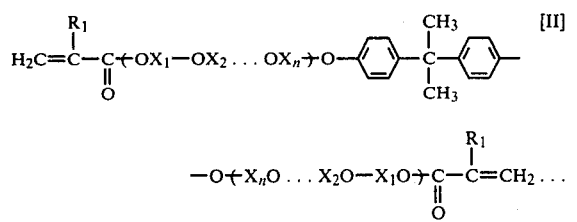

wherein R$_1$ stands for a hydrogen atom or a methyl group, X$_1$ through X$_n$, which may be the same or different, stand for an alkylene group having up to 6 carbon atoms in which one hydrogen atom may be substituted by a hydroxyl group, and n is integer of from 0 to 5, may be included in the monomer mixture.

As the bifunctional monomer represented by the general formula [II], for example, 2,2-bis(4-acryloxyphenyl)propane, 2,2-bis(4-methacryloxyphenyl)propane, 2,2-bis(4-acryloxyethoxyphenyl)propane, 2,2-bis(4-methacryloxyethoxyphenyl)propane, 2,2-bis(4-acryloxyethoxyphenyl)propane, 2,2-bis(4-methacryloxyethoxyphenyl)propane, 2,2-bis(4-acryloxydiethoxyphenyl)propane, 2,2-bis(4-methacryloxydiethoxyphenyl)propane, 2,2-bis(4-acryloxypropoxyphenyl)propane, 2,2-bis(4-methacryloxypropoxyphenyl)propane, 2,2-bis[4-acryloxy(2-hydroxypropoxy)phenyl]propane, 2,2-bis[4-methacryloxy(2-hydroxypropoxy)phenyl]propane, 2,2-bis-[4-acryloxy(2-hydroxypropoxyethoxy)phenyl]propane and 2,2-bis[4-methacryloxy(2-hydroxypropoxyethoxy)phenyl]propane can be mentioned.

When a monomer having in the molecule up to two methacryloyloxy or acryloyloxy groups and having a boiling point of at least 150° C. at normal pressure and a viscosity lower than 20 cp at 20° C. (hereinafter referred to as "monomer [III]" for brevity) is incorporated in the hardening solution, the surface smoothness, flexibility and adhesion of the cured coating to the shaped article are improved.

As preferred examples of the monomer [III], diethylene glycol dimethacrylate, diethylene glycol diacrylate, triethylene glycol dimethacrylate, triethylene glycol diacrylate, tetraethylene glycol dimethacrylate, dipropylene glycol dimethacrylate, dipropylene glycol diacrylate, 2-hydroxyethyl methacrylate, 2-hydroxyethyl acrylate, 2-hydroxypropyl methacrylate, 2-hydroxypropyl acrylate, glycidyl methacrylate, glycidyl acrylate, tetrahydrofulfuryl methacrylate, tetrahydrofulfuryl acrylate, ethoxyethyl methacrylate, ethoxyethyl acrylate, ethylcarbitol methacrylate, ethylcarbitol acrylate, butoxyethyl methacrylate, butoxyethyl acrylate, 1,4-butylene glycol monomethacrylate and 1,4-butylene glycol monoacrylate can be mentioned. These compounds have a hydroxyl group and/or a cyclic ether linkage and/or a linear ether linkage on the side chain or the monomer or between two methacyloyloxy or acryloyloxy groups, and they exhibit good polymerization activity. The monomer [III] is used in an amount of up to 70% by weight in the monomer mixture.

In order to initiate the polymerization smoothly by irradiation with ultraviolet rays, it is preferred that a photo-sensitizer be incorporated in the hardening solution in advance. As the photo-sensitizer, for example, carbonyl compounds such as benzoin, benzoin methyl ether, benzoin ethyl ether, benzoin pyopyl ether, acetoin, butyroin, toluoin, benzil, benzophenone, p-chlorobenzophenone and p-methoxybenzophenone; sulfur compounds such as tetramethyl thiuram monosulfide and tetramethyl thiuram disulfide; azo compounds such as azobisisobutyronitrile and azobis-2,4-dimethylvaleronitrile; and peroxide compounds such as benzoyl peroxide and di-t-butyl peroxide can be mentioned.

The photo-sensitizer is incorporated in an amount of up to 10 parts by weight, preferably 0.01 to 10 parts by weight, per 100 parts by weight of the monomer mixture or the sum of the monomer mixture and the organic solvent.

The organic solvent is used for controlling the viscosity of the hardening solution and forming a uniform coating. According to the desired conditions of the surface coating to be formed, a solvent selected from alcohols such as ethanol, isopropanol, n-propanol, isobutyl alcohol and n-butyl alcohol; aromatic hydrocarbons such as benzene, toluene, xylene and ethylbenzene; ketones such as acetone and methylethyl ketone; ethers such as dioxane; esters such as ethyl acetate, n-butyl acetate and propionic acid esters; polyhydric alcohols and derivatives thereof such as ethylene glycol, ethyl cellosolve, methyl cellosolve and diethyl cellosolve; and amides such as N,N'-dimethyl formamide is appropriately used. Furthermore, polymerizable monomers such as methyl acrylate, ethyl acrylate and methyl methacrylate may be used according to need.

The organic solvent is used in an amount of 10 to 95 parts by weight per 90 to 5 parts by weight of the monomer mixture. If the amount of the organic solvent is smaller than 10 parts by weight, the viscosity is high and the working properties of the hardening solution in coating operation are poor. If the amount of the organic solvent exceeds 95 parts by weight, the surface smoothness of the resultant coating is degraded.

As the synthetic resin article to be treated according to the present invention, for example, sheet-like shaped articles, rod-like shaped articles, cylindrical shaped articles and box-shaped articles can be mentioned, which are prepared from thermoplastic resins such as methyl methacrylate homopolymer and copolymer resins, polycarbonate resin, poly(allyl diglycol carbonte) resins, polystyrene resins, acrylonitrile/styrene copolymer resins (AS resins), poly(vinyl chloride) resins, acetate resins, ABS resins and polyester resins. Among these shaped articles, those prepared from poly(methyl methacrylate) resins, polycarbonate resin and poly(allyl diglycol carbonate) resins are popularly used for effectively utilizing their excellent optical properties, heat resistance and impact resistance, and in these shaped article, improvement of the abrasion resistance is eagerly desired. Accordingly, these shaped articles are preferably treated in the present invention.

The method of the present invention is especially effectively applied to coating of shaped articles in which coating of both the surfaces is not allowed because a secondary treatment (such as printing or plating) is conducted on one surface; coating of plastic solar energy collecting plates and lamp lenses of vehicles and ships; coating of shaped articles having a Fresnel lens groove on one surface; coating of outer surfaces of shaped articles in which inner surface coating of cylinders is not allowed because of dimension precision for fitting to other members; coating of the outer surface of a cylindrical shaped article which is difficult to coat on the inner surface thereof because the coating is cured by irradiation with ultraviolet rays and even if the coating is formed on the inner surface, the coating cannot be exposed to ultraviolet ray irradiation; coating of cassette case covers; and coating of plastic shaped articles having boss holes on one surface.

The amount of the hardening solution to be coated on the surface of the shaped article may be varied depending upon the amount of the monomer mixture contained in the coating composition and the intended objects. However, it is ordinarily necessary that the hardening solution be coated in such an amount that the thickness of a cured coating formed on the surface of synthetic resin shaped article is in the range of from 1 to 30μ. If the thickness of the cured coating formed on the surface of the shaped article is smaller than 1μ, the abrasion resistance is poor, and if the thickness of the cured coating exceeds 30μ, the flexibility of the cured coating is degraded and cracks are readily formed.

The shaped article coated with the hardening solution is hung on the hanger and is conveyed to the ultraviolet ray-irradiating zone by the second conveyor through the intermediate conveyor, and in this zone, the coating is cured. More specifically, in the ultraviolet ray-irradiating zone, a metal halide lamp, a low-pressure mercury lamp, a high-pressure mercury lamp or an ultra-high-pressure mercury lamp is used, and the hardening solution-coated surface is irradiated with ultraviolet rays to effect curing. Irradiation with ultraviolet rays may be carried out in an atmosphere of an inert gas such as nitrogen gas or carbon dioxide gas, or in an air atmosphere. The temperature of the irradiation atmosphere may be room temperature or an elevated temperature not causing undesirable deformation of the shaped article.

The apparatus of the present invention will now be described in detail with reference to the accompanying drawings.

Figure 2:
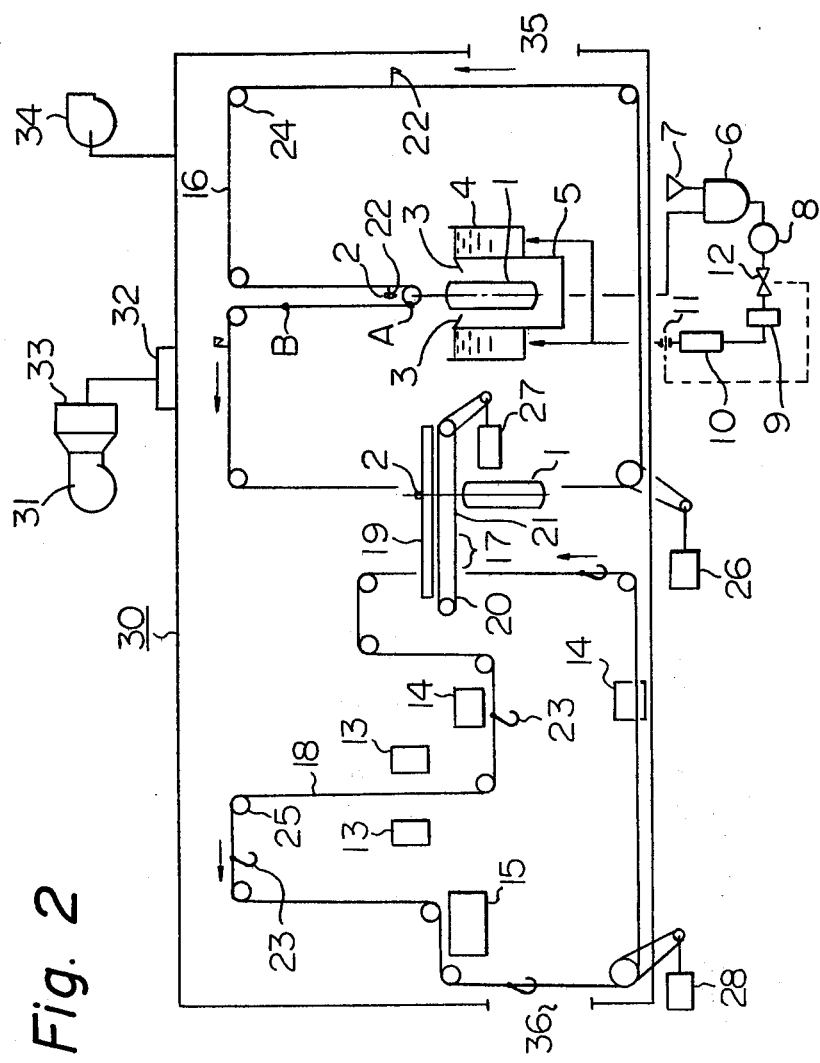

Referring to FIGS. 1 and 2, hooks 22 are rotatably attached at equal intervals to a first chain conveyor 16 turned around and moved along sprockets 24, and a hanger 2 having a synthetic resin article 1 hung thereon is by the first chain conveyor 16. From the point A to the point B, the hanger 2 is moved at a low pull-up speed by the first chain conveyor 16, and in the other regions, the hanger 2 is moved at a higher speed. In a coating solution tank 5, the synthetic resin article is brought into contact with a liquid film of a hardening solution flowing out from a guide plate 3 arranged downwardly at an inclination angle of 10° to 80° with respect to the horizontal direction, and while the synthetic resin article is moved at the pull-up speed from the point A to the point B, a wet coating having a uniform thickness is formed.

When the first chain conveyor 16 is travelled and the hanger 2 is placed on a loading rail 19 of an intermediate conveyor 17, the hanger 2 is conveyed to a left hand, predetermined position by a chain conveyor 20 having a hook 21. Hooks 23 are rotatably attached at appropriate intervals to a second chain conveyor 18 turned around and moved along sprockets 25 at a constant speed.

The hanger 2 on the loading rail 19 is moved, hung on the hook 23 of the second chain conveyor 18 and passed through ultraviolet ray irradiators 14, 13 and 15. During this travel, curing is effected. The dried and cured article which has passed through the ultraviolet ray irradiator 15 is taken out together with the hanger 2 from a take-out opening 36. In the drawings, referential numerals 26, 27 and 28 represent driving members for the first chain conveyor, intermediate conveyor and second chain conveyor, respectively.

The hardening solution is circulated through a solution recovery tank 6, a filter 9 and a heat exchanger 10 by a pump 8, and the flow rate of the solution in the circulation pipe line is detected by a flow meter 11 and controlled by a valve 12.

A treatment chamber 30 has an article inlet 35 and an article outlet 36 and surrounds conveyors 16, 17 and 18, coating solution tank 5 and ultraviolet ray irradiators 14, 13 and 15, and fresh air is introduced into the treatment chamber 30 through an air adjuster 33 and a filter 32 by an air feed fan 31.

The exhaust gas from the treatment chamber 30 is discharged by a discharge fan 34 and an exhaust gas discharge device (not shown) for cooling mercury lamps connected to the ultraviolet ray irradiators.

FIGS. 3 and 4 illustrate an embodiment of the present invention in which one surface of a plate-like shaped article is coated. In the drawings, reference numeral 37 represents securing plate members, for preventing the liquid impinging against the synthetic resin article from shaking the synthetic resin article and from turning to the back side of the article 1 (the side opposite to the liquid film guide plate 3).

In this embodiment, the synthetic resin article 1 hung on the hanger 2 through a holding member 43 is moved upward at a predetermined speed by the first conveyor 16, and the coated surface of the synthetic resin article 1 gradually separates from the point of initiation of the contact between the liquid film and the synthetic resin article, whereby a coating is formed.

Figure 5:
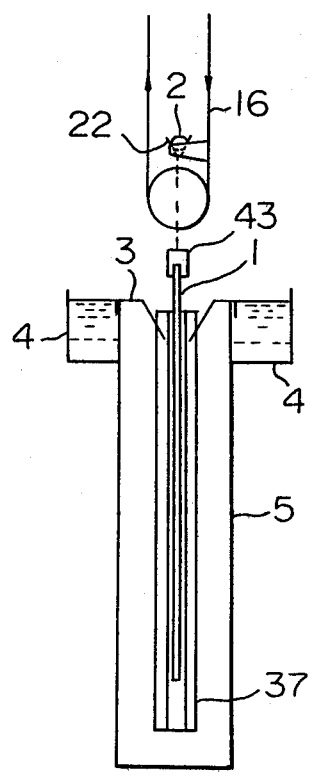
FIG. 5 is a longitudinally sectional view showing the coating apparatus for use in an embodiment in which both the surface of a flat plate article are coated.
Figure 6:
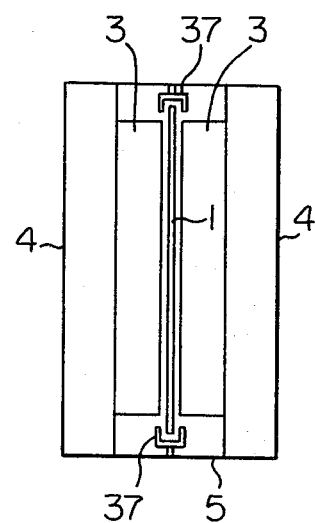
FIG. 6 is a top view of the apparatus shown in FIG. 5.

FIGS. 5 and 6 illustrate an embodiment of the present invention in which both the surfaces of a plate-like shaped article are coated. In this embodiment, liquid film guide plates 3 and hardening solution tanks 4 are arranged on both the sides of the synthetic resin article 1.

Figure 7:
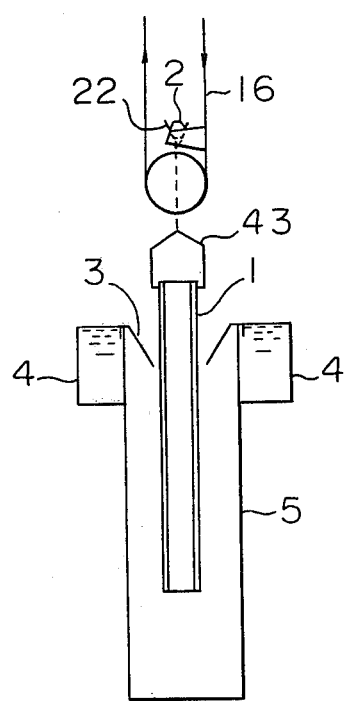
FIG. 7 is a longitudinally sectional view showing the coating apparatus for use in an embodiment in which the outer surface of a cylindrical article is coated.
Figure 8:
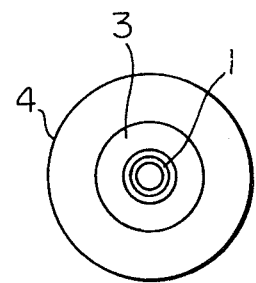
FIG. 8 is a top view of the coating apparatus shown in FIG. 7.

FIGS. 7 and 8 illustrate an embodiment of the present invention in which the outer surface of a cylinder is coated. In this embodiment, the hardening solution tank 4 and the liquid film guide plate 3 are arranged around the synthetic resin article 1.

Figure 9:
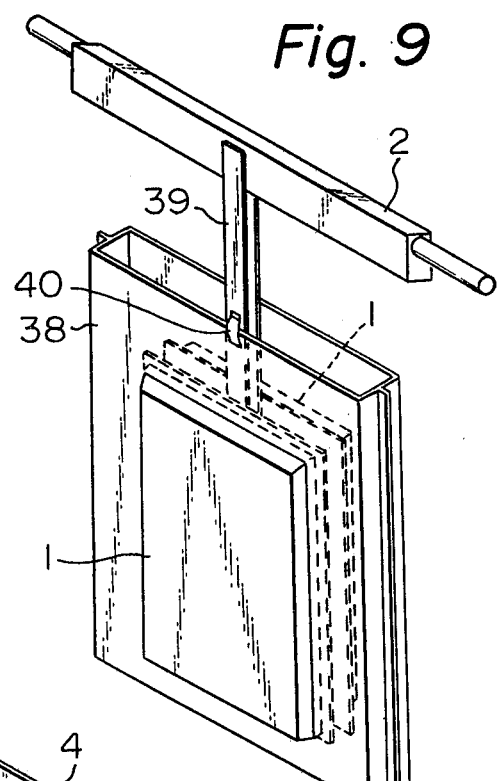
FIG. 9 is a perspective view showing an article-securing plate attached to a case-like synthetic resin article.

FIG. 9 illustrates an embodiment in which a box-like article 1 is attached to an article-securing metal plate member 38 for preventing intrusion and turning of the hardening solution to the back surface, and the securing plate member 38 is held by an attachment spring 40 of a post 39 extending from the hanger 2. In this embodiment, the surfaces of projections of two articles can similtaneously be coated.

Figure 10:
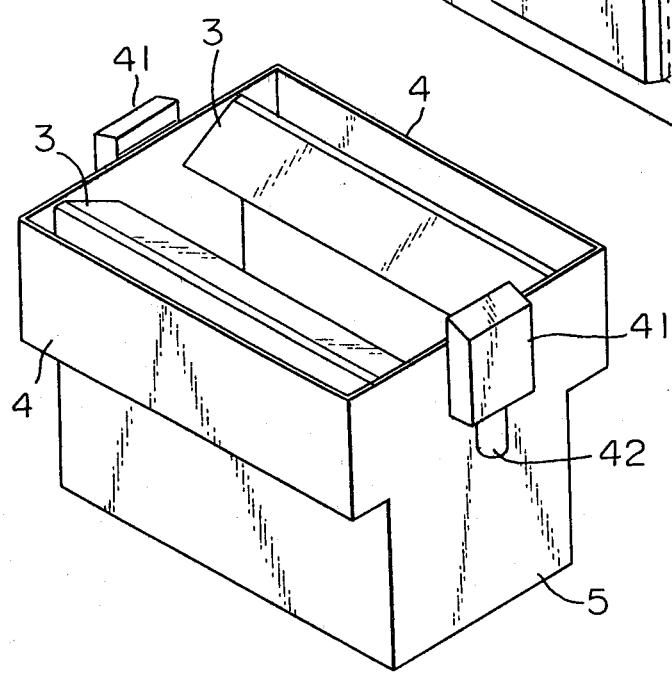
FIG. 10 is a perspective view showing a coating solution tank having a suction opening formed thereon.

FIG. 10 illustrates an embodiment in which an improved hardening solution tank 4 is used. In this embodiment, in order to maintain the above-mentioned temperature condition in the atmosphere where a coating is formed on the synthetic resin article 1, suction opening 41 is formed and solvent-containing air is discharged from the treatment chamber through a nozzle 42.

The present invention will now be described in detail with reference to the following Examples.

EXAMPLE 1

A surface-hardening solution for a methacrylic resin plate, comprising 10 parts by weight of dipentaerythritol hexaacrylate, 15 parts by weight of dipentaerythritol pentaacrylate, 5 parts by weight of dipentaerythritol tetraacrylate, 10 parts by weight of tetrahydrofurfuryacrylate, 30 parts by weight of isopropyl alcohol, 30 parts by weight of toluene and 2 parts by weight of benzoin ethyl ether, was charged in the solution recovery tank 6 of the apparatus shown in FIGS. 1 and 2, and the coating operation was carried out. The viscosity of the surface-hardening solution was 3.5 cP as measured at 25° C. The width of the liquid film guide plate was 500 mm, and the downward inclination angle of the guide plate with respect to the horizontal direction was 35°. The flow rate was adjusted to 7 ml per cm of the width of the liquid film and per second by the flow rate control valve.

A methacrylic resin plate having a thickness of 3 mm, a width of 550 mm and a length of 400 mm was attached to the first conveyor through the hanger, and the article-securing plate member is arranged so that the resin plate was located about 10 mm apart from the liquid separation end of the liquid film guide plate. The resin plate was pulled up at a speed of 0.7 cm/sec along the article-securing plate member. The ambient temperature was 28° C., and the relative humidity was 60% (the dew point was 19.5° C.).

The resin plate was conveyed through the intermediate conveyor by the second conveyor to the ultraviolet irradiation zone were the coating was cured by a 5-KW high-pressure mercury lamp. The coated surface of the obtained one surface-coated plate was free of any thickness, unevenness or flow pattern and was excellent in smoothness. The thickness of the cured coating on the coated plate was 3.8 μm as measured by an electron microscope.

EXAMPLE 2

A one surface-coated plate was prepared by the same process as in Example 1 except that the methacrylic resin plate was pulled up at a speed of 1.3 cm/sec. The coated surface had a good smoothness comparable to that of the coated surface obtained in Example 1. The thickness of the cured coating was 5.2 μm.

EXAMPLE 3

A one surface-coated plate was prepared by the same process as in Example 1 except that the flow rate was 12 ml per cm of the width of the liquid film and per second. The obtained coated surface had a good smoothness comparable to that of the coated surface obtained in Example 1. The thickness of the cured coating was 4.0 μm.

COMPARATIVE EXAMPLE 1

A one surface-coated plate was prepared by the same process as in Example 1 except that the ambient temperature was 23° C. and the relative humidity was 80% (the dew point was 19.2° C.). In the surface portion of the coated surface, the coating was partially washed away by the solvent condensed in the atmosphere of the coating solution tank, and no uniform coating was obtained. This defect was caused because the ambient temperature was lower than the temperature of the hardening solution.

COMPARATIVE EXAMPLE 2

A one surface-coated plate was prepared by the same process as in Example 1 except that the temperature of the hardening solution was 20° C., the ambient temperature was 50° C. and the relative humidity was 16% (the dew point was 15° C.) Conspicuous gear-like marks were formed on the cured coating because of uneven thickness. When the amibient temperature was changed to 37° C. with all other conditions remaining substantially the same, such gear-like marks have been observed only to a negligible extent.

COMPARATIVE EXAMPLE 3

A one surface-coated plate was prepared by the same process as in Example 1 except that the temperature of the hardening solution was 20° C., the ambient temperature was 30° C. and the relative humidity was 70% (the dew point was 23° C.). A defect of orange peel appeared on the cured coating of the coated plate. This defect was caused because of condensation of water in the atmosphere on the coated surface.

EXAMPLE 4

A cured film was formed on the outer surface (the surface on which a Fresnel groove was not formed) of a front light lens (300 mm in length, 160 mm in width and 35 mm in height) of a polycarbonate resin for a vehicle by using the hardening solution described in Example 1 and the combination of the devices shown in FIGS. 1, 2, 9 and 10. The width of the liquid film guide plates was 450 mm, and the inclination angle with respect to the horizontal direction was 45° on both the sides. The flow rate was adjusted to 9 ml per cm of the width of the liquid film per second by the flow rate control valve.

The temperature of the hardening solution was 23° C., the ambient temperature was 28° C. and the relative humidity was 55% (the dew point was 18.2° C.). The pull-up speed was 0.8 cm/sec and the delivery speed of the second conveyor was 1.5 cm/sec. The obtained cured coating had a beautiful appearance. The thickness of the coating was 4.2 to 4.5 μm throughout the front surface. When the coated surface was rubbed with steel wool (#000), no scratch was formed.

We claim:

1. A method for coating the surface of a synthetic resin article and hardening said coating, wherein the synthetic resin article is brought into countercurrent contact with a freely falling liquid film of a surface-hardening solution while the synthetic resin article is gradually pulled up, to coat the surface of the synthetic resin article with the surface-hardening solution, and the coated synthetic resin article is irradiated with ultraviolet rays to cure the coating, said method being characterized in that (a) the synthetic resin article is conveyed to a hardening solution tank by a first conveyor where the synthetic resin article is coated with the hardening solution and the coated synthetic resin article is then conveyed to an ultraviolet ray-irradiating step by a second conveyor through an intermediate conveyor; (b) the surface-hardening solution is caused to flow down on liquid film guide plates attached to the hardening solution tank, at a flow rate of 2 to 15 ml per second and per cm of the width of the liquid film guide plate, and the countercurrent contact of the synthetic resin article with the liquid film is initiated at a point 3 to 30 mm apart from the flow-out end of the guide plates; and (c) the hardening solution is circulated to effect the temperature adjustment and filtration.

2. A method according to claim 1 wherein the surface hardening solution comprises an acrylic monomer as the main component, and the temperature (Ts) of the hardening solution and the ambient temperature (Ta) are adjusted so that the following formulae are satisfied:

$$10° C. \leq Ts \leq 30° C., Ts < T_a \text{ and } Ta - Ts < 20° C.,$$

and the dew point of the atmosphere is controlled to a level of at least 3° C. lower than the Ts.

3. An apparatus for coating the surface of a synthetic resin article and hardening said coating, wherein the synthetic resin article is brought into countercurrent contact with a freshly falling liquid film of a surface-hardening solution while the synthetic resin article is gradually pulled up, to coat the surface of the synthetic resin article with the surface-hardening solution, and the coated synthetic resin article is irradiated with ultraviolet rays to cure the coating, said apparatus comprising (a) a conveyor device comprising a first conveyor for conveying the synthetic resin article to a hardening solution tank to coat the synthetic resin article with the surface-hardening solution, a second conveyor for conveying the synthetic resin article to an ultraviolet ray-irradiating device and an intermediate conveyor for transferring hangers each having the synthetic resin article hung thereon from the first conveyor to the second conveyor; (b) a device comprising guide plates attached to the hardening solution tank in the state inclined downwardly at an angle of 10° to 80° with respect to the horizontal direction to form a freely falling liquid film of the surface-hardening solution, with which the surface of the synthetic resin article is brought into countercurrent contact; (c) a device comprising a pump for circulating the solution through a pipe line from and to the hardening solution tank, and a filter, a heat exchanger, a flow rate-controlling valve and a flow rate-detecting pressure gauge or flowmeter, which are arranged downstream of the circulating pipe line; and (d) a device comprising a substantially closed treating chamber integrally surrounding said conveyor device, hardening solution tank and ultraviolet ray-irradiating device, an air feed fan for feeding air into said treating chamber, a filter for removing dusts from air and an air conditioner for adjusting the temperature and humidity of air.

4. A coating apparatus for hardening the surface of a synthetic resin article according to claim 3, wherein an air-sucking opening is formed in the upper side portion of the surface-hardening solution tank.

5. A coating apparatus for hardening the surface of a synthetic resin article according to claim 3, wherein a securing plate member or members are mounted on the synthetic resin article to prevent intrusion and turning of the surface-hardening solution onto a part or all of the peripheral edge of the synthetic resin article.

* * * * *